United States Patent
Stoia et al.

(10) Patent No.: US 10,644,331 B2
(45) Date of Patent: May 5, 2020

(54) RAPID START HYBRID SOLID OXIDE FUEL CELL POWER SYSTEM

(71) Applicant: The Boeing Company, Chicago, IL (US)

(72) Inventors: Tina Stoia, Rancho Santa Margarita, CA (US); Shailesh Atreya, Irvine, CA (US); Chellappa Balan, Mason, OH (US); David Whelan, Newport Coast, CA (US); David J. Glll, Huntington Beach, CA (US); Vincent J. Castelli, Alexandria, VA (US)

(73) Assignee: The Boeing Company, Chicago, IL (US)

( * ) Notice: Subject to any disclaimer, the term of this patent is extended or adjusted under 35 U.S.C. 154(b) by 167 days.

(21) Appl. No.: 15/332,191

(22) Filed: Oct. 24, 2016

(65) Prior Publication Data
US 2018/0114995 A1  Apr. 26, 2018

(51) Int. Cl.
| H01M 8/04 | (2016.01) |
| H01M 8/04014 | (2016.01) |
| H01M 8/04225 | (2016.01) |
| H01M 8/04111 | (2016.01) |
| H01M 8/0612 | (2016.01) |
| H01M 8/0662 | (2016.01) |
| H01M 8/124 | (2016.01) |

(52) U.S. Cl.
CPC .... *H01M 8/04022* (2013.01); *H01M 8/04111* (2013.01); *H01M 8/04225* (2016.02); *H01M 8/0618* (2013.01); *H01M 8/0662* (2013.01); *H01M 2008/1293* (2013.01); *H01M 2250/20* (2013.01); *H01M 2250/402* (2013.01); *Y02B 90/12* (2013.01); *Y02E 60/525* (2013.01); *Y02T 90/32* (2013.01)

(58) Field of Classification Search
CPC ....................................................... H01M 8/04
See application file for complete search history.

(56) References Cited

U.S. PATENT DOCUMENTS

| 5,413,879 A * | 5/1995 | Domeracki | ....... H01M 8/04007 |
| | | | 429/434 |
| 6,834,831 B2 | 12/2004 | Daggett | |
| 7,410,713 B2 | 8/2008 | Balan et al. | |
| 8,127,758 B2 | 3/2012 | Atreya et al. | |

(Continued)

*Primary Examiner* — Jacob B Marks
(74) *Attorney, Agent, or Firm* — Toler Law Group, PC

(57) ABSTRACT

A rapid start power unit and a method of operating a rapid start power unit are disclosed. A fuel cell converts combustible fuel into electrical power during a normal operational period after an initial start-up period when little to no electrical energy is produced. One combustion chamber receives unspent fuel emitted by the fuel cell and combusts the unspent fuel to generate a first heated gas stream. Another combustion chamber receives combustible fuel and burns the combustible fuel to generate a second heated gas stream during the initial start-up period. A turbine receives and is driven by the first and second heated gas streams to drive a drive shaft. A generator coupled to the drive shaft generates electrical power during the initial start-up period and supplemental power during the normal operational period. In an alternative embodiment, a two-stage combustion chamber is used instead of two serially-arranged separate combustion chambers.

20 Claims, 3 Drawing Sheets

(56) References Cited

U.S. PATENT DOCUMENTS

| | | |
|---|---|---|
| 8,231,774 B2 | 7/2012 | Atreya et al. |
| 9,017,890 B2 | 4/2015 | Mata et al. |
| 2005/0266288 A1* | 12/2005 | Zafred ................ H01M 8/0276 429/415 |

* cited by examiner

RAPID START HYBRID SOLID OXIDE FUEL CELL POWER SYSTEM

FIELD

This disclosure relates generally to a rapid start hybrid solid oxide fuel cell power system, and, more particularly, to a hybrid solid oxide fuel cell power system adapted to provide a shorter duration start-up period before fuel cell power output commences.

BACKGROUND

A solid oxide fuel cell ("SOFC") is an electrochemical conversion device that produces electricity from oxidizing a fuel (e.g., hydrogen) at very high temperatures (typically 600° C. to 1000° C.). Each cell of an SOFC stack consists of a ceramic electrolyte positioned between an anode on one side and a cathode on the other. An oxidizing gas like air or oxygen passes over the cathode side, and when an oxygen molecule contacts the cathode/electrolyte interface, it catalytically acquires four electrons from the cathode and splits into two oxygen ions. The oxygen ions diffuse into the electrolyte and migrate to the other side of the cell (anode). The oxygen ions encounter fuel at the anode/electrolyte interface and react catalytically, producing water, heat, and two electrons (per oxygen ion). The electrons transport through the anode to the external circuit and back to the cathode. This provides a source of useful electrical power. Not all of the fuel is utilized, and so left-over fuel ("unspent fuel"), water vapor, and any other fuel byproducts exit the anode side of the fuel cell. The remaining oxygen, and inert portions of the air stream (e.g., nitrogen) exit the cathode side.

Highly efficient, low emission power systems may be based on this technology. The efficiency of an SOFC power system can be further augmented if it is paired with a bottoming cycle, such as a turbine-compressor-generator, to scavenge the high quality waste heat from the SOFC. This embodiment is referred to as a "hybrid-SOFC Power System". The efficiency of such a system far exceeds that of an internal combustion engine (ICE), with drastically reduced emissions. The efficiency of a hybrid-SOFC power system also exceeds that of a proton exchange membrane fuel cell (PEMFC). Additionally, a hybrid-SOFC power system is a lighter option (i.e., has a higher energy density) than a battery.

SOFCs also have another advantage over PEMFCs and batteries as they can operate on heavy hydrocarbon fuels if the fuel is properly processed. Heavy hydrocarbon fuels, such as jet fuel, must be decomposed using a "reformer" to form products like carbon monoxide and hydrogen before use in a fuel cell. For a PEMFC, carbon monoxide is a poison to the anode, so an additional step is required to convert the carbon monoxide into carbon dioxide and hydrogen (water-gas shift reaction). SOFCs are better suited to heavy hydrocarbon fuels because the water-gas shift reaction occurs within the stack under equilibrium conditions. Additional hydrogen is thereby produced and is used as a fuel. In addition, heavy hydrocarbon fuels contain sulfur to varying degrees. Sulfur compounds are known to poison the catalytic activity of many metals, including anode materials of fuel cells. As a result, PEMFCs cannot withstand any sulfur in the fuel. SOFCs are more tolerant of sulfur, and processing of the fuel with a "desulfurizer" or utilizing an ultra-low sulfur fuel can reduce sulfur levels to acceptable levels (e.g., less than 10 ppmw). SOFCs can therefore offer very high efficiencies and low emissions, while also providing the ease of use of readily available hydrocarbon fuels.

SOFC stacks operate at temperatures of 600° C. to 1000° C. and are made up of several different materials that are chosen to ensure electrochemical performance while minimizing thermal expansion differences so that damage doesn't occur during thermal transients, like start-up. Since the materials are not a perfect thermal match, compliance in the stack is enabled by design tolerances and proper start-up procedures. Typical test stand stack heating rates are about 3° C. to 5° C. per minute, but could be as high as 30° C. per minute for a well-designed stack. Therefore, it could take anywhere from 30 minutes to well over an hour to heat up such a system. During this start-up period, little or no electrical power is produced, however.

Accordingly, there is a need for a hybrid-SOFC power system that overcomes the problems discussed above.

SUMMARY

In a first aspect, a rapid start power unit includes a fuel cell configured to convert combustible fuel into electrical power during a normal operational period after an initial start-up period. A first combustion chamber is configured to receive unspent fuel emitted by the fuel cell and to combust the unspent fuel to generate a first heated gas stream. A second combustion chamber is configured to receive combustible fuel and to burn the combustible fuel to generate a second heated gas stream during the initial start-up period. A turbine is configured to receive the first and second heated gas streams and to be driven by the first and second heated gas streams. The turbine is further configured to drive a drive shaft. A generator is coupled to the drive shaft and is configured such that the driving of the drive shaft by the turbine generates electrical power during the initial start-up period and supplemental power after the initial start-up period.

In a further embodiment, a compressor may be coupled to the drive shaft and may be configured to compress a source of oxidizing gas for supplying compressed oxidizing gas to the fuel cell. The fuel cell may be a solid oxide fuel cell and the combustible fuel may be a hydrocarbon fuel. A reformer may be configured to assist in converting the combustible fuel into reactants used by the fuel cell. The reformer may be one of a steam reformer, a catalytic partial oxidation reformer, or an autothermal reformer. The reactants may be converted from the combustible fuel by the reformer may include carbon monoxide and hydrogen. The first combustion chamber may be a catalytic combustion chamber.

In a second aspect, a rapid start power unit includes a fuel cell configured to convert combustible fuel into electrical power during a normal operational period after an initial start-up period. A two stage combustion chamber has a first stage configured to receive unspent fuel emitted by the fuel cell and to combust the unspent fuel to generate a first heated gas stream and a second stage configured to receive combustible fuel and to burn the combustible fuel to generate a second heated gas stream during the initial start-up period. A turbine is configured to receive the first and second heated gas streams and to be driven by the first and second heated gas streams. The turbine is further configured to drive a drive shaft. A generator is coupled to the drive shaft and is configured such that the driving of the drive shaft by the turbine generates electrical power during the initial start-up period and supplemental power during the normal operational period.

In a further embodiment, a compressor may be coupled to the drive shaft, the compressor being configured to compress a source of oxidizing gas for supplying compressed oxidizing gas to the fuel cell. The fuel cell may be a solid oxide fuel cell and the combustible fuel may be a hydrocarbon fuel. A reformer may be configured to assist in converting the combustible fuel into reactants used by the fuel cell. The reformer may be one of a steam reformer, a catalytic partial oxidation reformer, or an autothermal reformer. The reactants converted from the combustible fuel by the reformer may include carbon monoxide and hydrogen. The first stage of the two stage combustion chamber may be a catalytic combustion chamber.

In a third aspect, a rapid start power unit includes a fuel cell configured to convert hydrogen into electrical power during a normal operational period after an initial start-up period. A first combustion chamber is configured to receive hydrogen and to burn the hydrogen to generate a first heated gas stream during the initial start-up period. A turbine is configured to receive the first heated gas stream and to be driven by the first heated gas stream. The turbine is further configured to drive a drive shaft. A generator is coupled to the drive shaft and is configured such that the driving of the drive shaft by the turbine generates electrical power during the initial start-up period.

In one further embodiment, a second combustion chamber may be configured to receive unspent fuel emitted by the fuel cell and to combust the unspent fuel to generate a second heated gas stream. The turbine may also be configured to receive the second heated gas stream and to be driven by the second heated gas stream. The generator may be configured such that the driving of the drive shaft by the turbine generates electrical power during the initial start-up period and during the normal operational period.

In another further embodiment, the first combustion chamber may be a two stage combustion chamber having a first stage configured to receive the hydrogen and to burn the hydrogen to generate a first heated gas stream during the initial start-up period and a second stage configured to receive unspent fuel emitted by the fuel cell and to combust the unspent fuel to generate a second heated gas stream. The turbine may also be configured to receive the second heated gas stream and to be driven by the second heated gas stream. The generator may be configured such that the driving of the drive shaft by the turbine generates electrical power during the initial start-up period and during the normal operational period.

In a fourth aspect, a method for rapidly supplying electrical power is described. Combustible fuel is chemically converted into electrical power during a normal operational period after an initial start-up period. Unspent fuel emitted by the chemical conversion of combustible fuel is combusted to generate a first heated gas stream. Combustible fuel is burned to generate a second heated gas stream during the initial start-up period. The first and second heated gas streams are used to mechanically drive a generator to produce electrical power during the initial start-up period and during the normal operational period.

In a further embodiment, the step of using the first and second heated gas streams to mechanically drive the generator may comprise providing the first and second heated gas streams to a turbine that drives a drive shaft coupled to the generator to produce electricity. Also, a fuel cell may perform the step of chemically converting combustible fuel into electrical power.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

A hybrid solid oxide fuel cell ("SOFC") power system provides an efficient and environmentally-friendly power supply. However, typical start-up times can be prohibitively long due to the high operating temperatures and required start-up time of such systems. As discussed in detail below, the embodiments disclosed herein enable the production of a substantial amount of power (commensurate with the rating of the SOFC Power System for output after the start-up time) during the initial start-up period of the SOFC by operating at least one turbine coupled with a generator.

Figure 1:
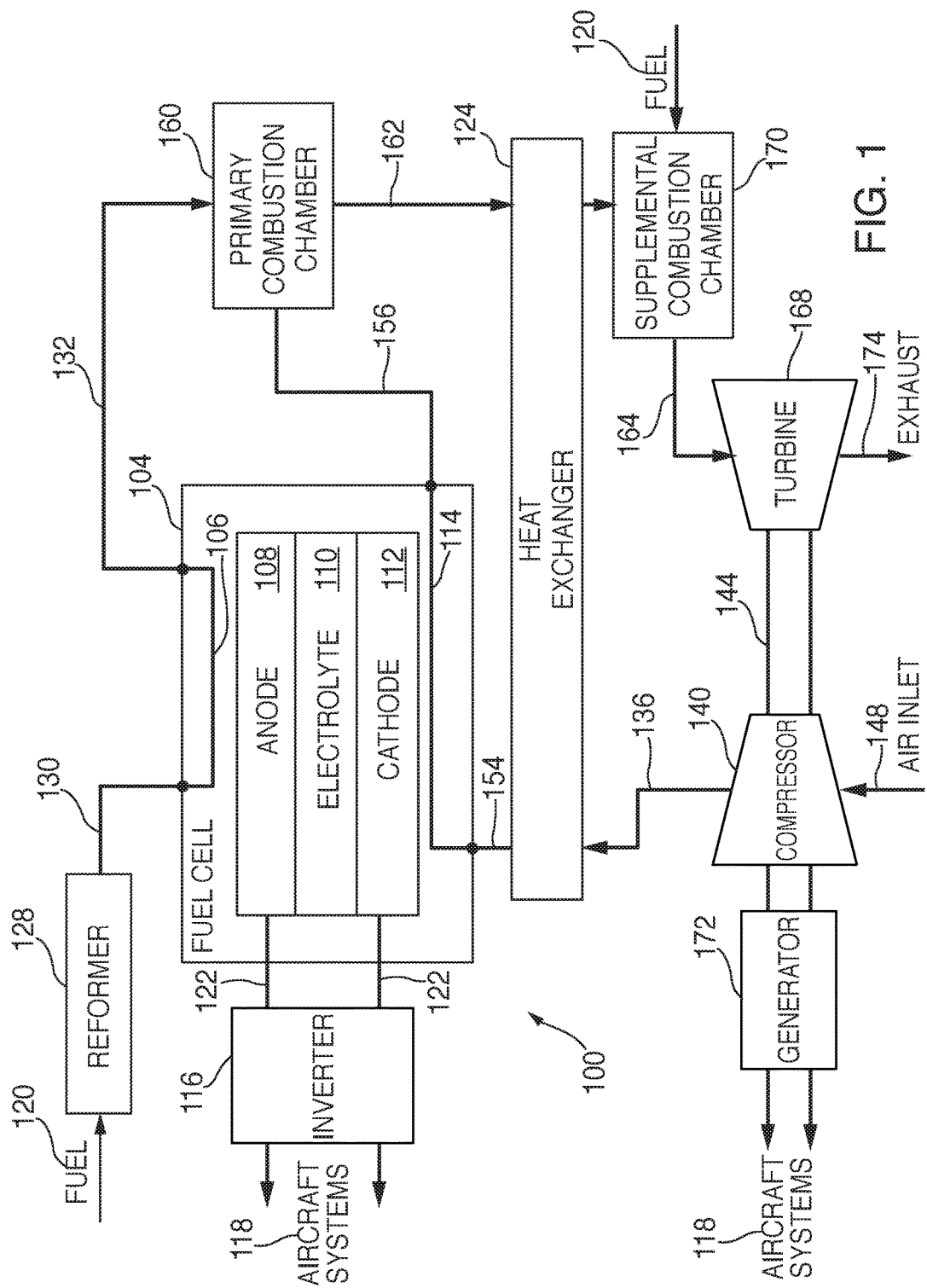
FIG. 1 is a block diagram of a first embodiment of a hybrid solid oxide fuel cell power system incorporating a rapid start-up subsystem according to the present disclosure.

Referring now to FIG. 1, a first embodiment of a hybrid solid oxide fuel cell power system 100 is shown. A fuel cell 104 has an anode portion 108, an electrolyte portion 110 and a cathode portion 112 which together provide direct current (DC) power at output 122 when fuel is provided through fuel passageway 106 and an oxidizing gas is provided through passageway 114. The DC power provided can, in turn, be supplied to an inverter 116 to provide alternating current (AC) power output to aircraft electrical systems 118. Thus, both DC power (via a direct connection to output 122 of fuel cell 104) and AC power (via a connection to the output of inverter 116) may be provided by an embodiment of the present disclosure. Although the exemplary embodiment herein described refers to an aircraft application for hybrid solid oxide fuel cell power system 100, embodiments of the present disclosure also could be used in other transportation power systems, such as ships, tanks, military vehicles, trains, and others. Embodiments of the present disclosure also could be used for ground-based stationary power generating applications.

Fuel cell 104 receives a supply of hydrocarbon fuel 120 which travels through fuel passageway 106. The hydrocarbon fuel supply 120 may be routed through a reformer (or pre-reformer) 128 to generate carbon monoxide and hydrogen for the fuel cell 104. The reformer (or pre-reformer) 128 may be a steam reformer, a catalytic partial oxidation reformer, an autothermal reformer, or another similar type of reforming apparatus which can convert fuel into the carbon monoxide and hydrogen reactants used by the fuel cell 104.

Heat exchangers may be located throughout the system to recuperate heat from the fuel cell exhaust for the incoming reactants.

Fuel cell 104 also receives a supply of an oxidizing gas, like air or oxygen, 154 through gas passageway 114 which, in embodiments of the present disclosure, is a pressurized supply. In one presently preferred embodiment, a compressor 140, driven by a shaft 144 through a process which will be further described below, compresses the input oxidizing gas supply. A single compressor 140 is shown in FIG. 1, although in other embodiments more than one compressor may be included. The efficiency of a fuel cell 104 may be augmented by increasing the operating pressure of the oxidizing gas 136 and fuel 130. This is particularly true and important at altitude where the ambient pressure is low.

In the embodiment shown in FIG. 1, a suitable oxidizing gas input supply may be oxygen, ambient air, or aircraft cabin air via an air inlet 148. In an aircraft application, using aircraft cabin air that is already pressurized increases the pressure of input gas to the fuel cell from the ambient pressure of about 3.5 pounds per square inch (PSI) at a typical commercial airline cruising altitude of about 35,000 feet to about 10.9 PSI or more, that is a typical cabin pressure. Moreover, compressing the cabin air using the compressor 140 can further increase the fuel cell efficiency.

As shown in FIG. 1, the exhaust 132 generated by the anode portion 108 of the fuel cell 104 and the exhaust 156 produced by the cathode portion 112 of the fuel cell are collected and combusted in a primary combustion chamber 160. The primary combustion chamber 160 is preferably a catalytic combustion chamber (to reduce emissions and to utilize low quality/highly diluted fuel). The exhaust 132 of the anode portion 108 contains unspent hydrocarbon fuel which was not converted by the chemical reactions within the fuel cell 104 and byproducts of the reactions. Capturing and combusting this unspent hydrocarbon fuel in the primary combustion chamber 160 during nominal operation of fuel cell 104 (i.e., the period that occurs after the initial start-up period) results in a pressurized heated gas stream which can forcibly drive a turbine 168, and thereafter be discarded as exhaust 174. Although only a single turbine 168 is shown in FIG. 1, in other embodiments more than one turbine may be included. The turbine 168 mechanically drives the compressor 140 through the drive shaft 144 and any surplus mechanical power is converted to electrical power by the generator 172. The surplus electrical power from the generator is a fraction of the overall SOFC Power System rating during nominal operation. The generator 172 may also serve as a starter to start the compressor 140 before power is available from the turbine 168.

However, as discussed above, a significant start-up time is required to heat the elements in fuel cell 104 to their required operating temperatures. During the initial start-up period, catalytic combustion 160 of the exhaust fuel from fuel cell 104 to drive turbine 168 will not provide power commensurate with the SOFC Power System rating. To overcome this problem, this embodiment of the present disclosure provides a supplemental conventional, combustion chamber 170 that receives and burns a supply of undiluted hydrocarbon fuel 120 during the initial start-up period to produce a pressurized gas stream that drives turbine 168. This embodiment generates power commensurate with the SOFC Power System rating during start-up, but with increased emissions (conventional combustion produces mono-nitrogen oxide (NOx)) and a lower efficiency. The generator is sized to provide the total rated power of the SOFC Power System.

As shown in FIG. 1, the output of the primary combustion chamber 160 is a pressurized heated gas stream 162. Downstream of the primary combustion chamber 160 is supplemental combustion chamber 170. In an alternative embodiment, supplemental combustion chamber 170 may be positioned in parallel with primary combustion chamber 160. Supplemental combustion chamber 170 is preferably a conventional (i.e., not catalytic) combustion chamber. During nominal operation of the fuel cell 104 (i.e., the period after the initial start-up that begins when the fuel cell 104 reaches the proper operating temperatures), the supplemental combustion chamber 170 is inactive (i.e., the undiluted hydrocarbon fuel supply 120 to supplemental combustion chamber 170 is disconnected) and the pressurized heated gas stream 162 is inertly passed through supplemental combustion chamber 170 on its way to turbine 168. During the start-up period, undiluted hydrocarbon fuel supply 120 is provided to supplemental combustion chamber 170, which burns the fuel to create an alternative source for the pressurized gas stream 164 to drive turbine 168. Turbine 168 is coupled to drive shaft 144. Drive shaft 144 mechanically powers compressor 140 and provides mechanical power to generator 172 for conversion to electrical power for electrical systems 118. There is at least one heat exchanger 124 configured to recuperate heat from the fuel cell 104 exhaust for the incoming reactants.

By conventionally combusting undiluted fuel, the system of the present disclosure provides a significant amount of electrical power, via generator 172, during the initial start-up period while the fuel cell 104 is heating up.

In FIG. 1, all of the DC output of the fuel cell 104 is shown as being supplied to the inverter 116 to provide AC current to the aircraft systems 118, and the inherently AC output of the generator 172 is also shown as being provided directly to aircraft systems 118. However, as will be appreciated by one ordinarily skilled in the art, electric power output by the fuel cell 104 and/or the generator 172 can be divided, directed, and/or converted as needed to provide quantities of AC and DC electric power as desired for various aircraft systems both during and after the initial start-up period of fuel cell 104.

Figure 2:
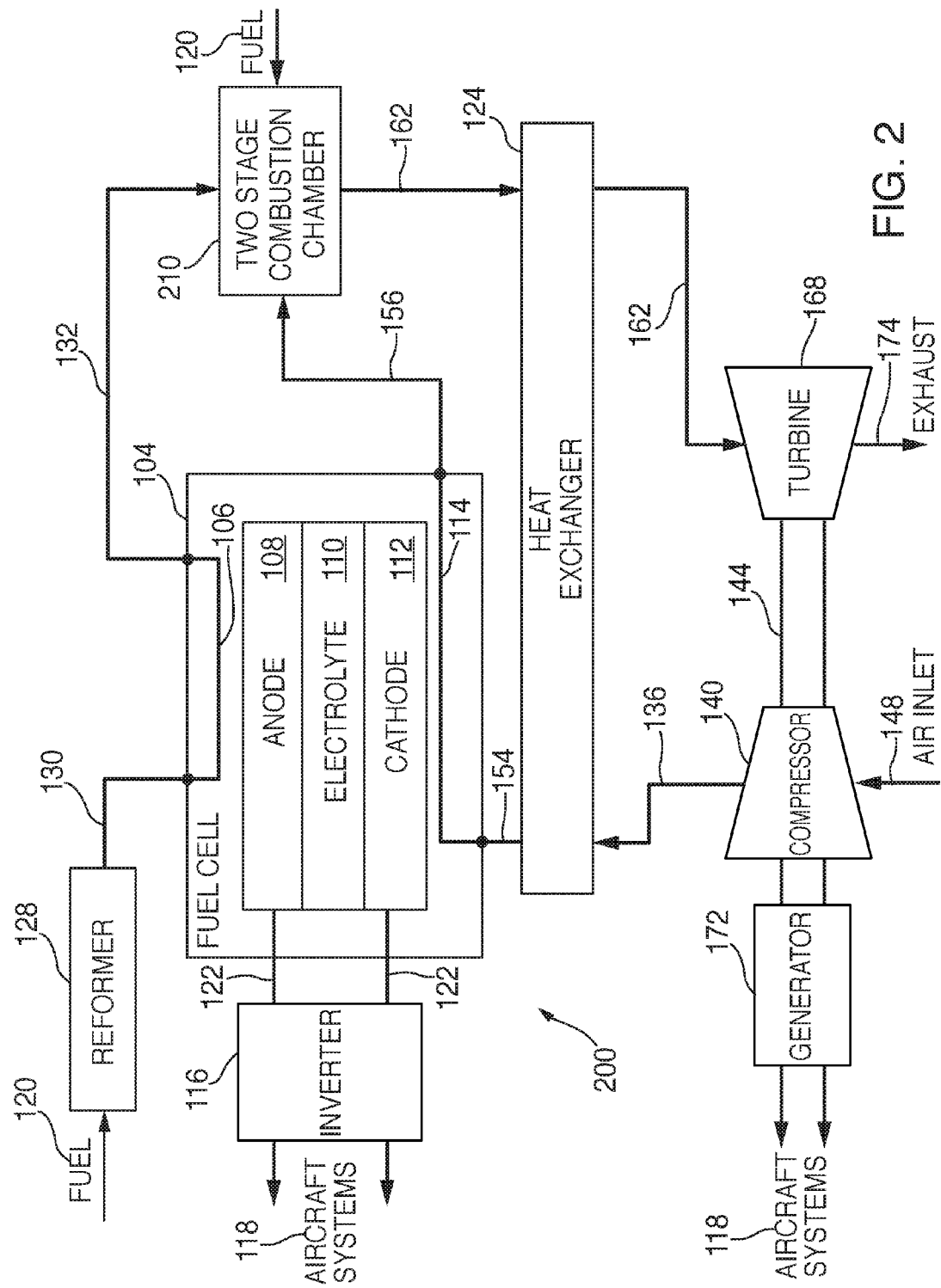
FIG. 2 is a block diagram of a second embodiment of a hybrid solid oxide fuel cell power system incorporating a rapid start-up subsystem according to the present disclosure.

Referring now to FIG. 2, a second embodiment of a hybrid solid oxide fuel cell power system 200 is shown. In this second embodiment, the primary combustion chamber 160 and supplemental combustion chamber 170 of the first embodiment shown in FIG. 1 are replaced with a single dual stage combustion chamber 260. Dual stage combustion chamber 260 produces a pressurized gas stream 162 that drives turbine 168. Dual stage combustion chamber 260 includes a first stage optimized for combusting the exhaust gases from fuel cell 104 (e.g., the first stage is a catalytic combustion chamber) and a second stage optimized for burning undiluted hydrocarbon fuel that is supplied via fuel supply 220 (e.g., the second stage is a conventional combustion chamber). The second stage is preferably active only during the initial start-up period, while the first stage is active both during the initial start-up period (although the output is low) and nominal operation after completion of the initial start-up period. At least one heat exchanger 124 is configured to recuperate heat from the fuel cell 104 exhaust for the incoming reactants.

Figure 3:
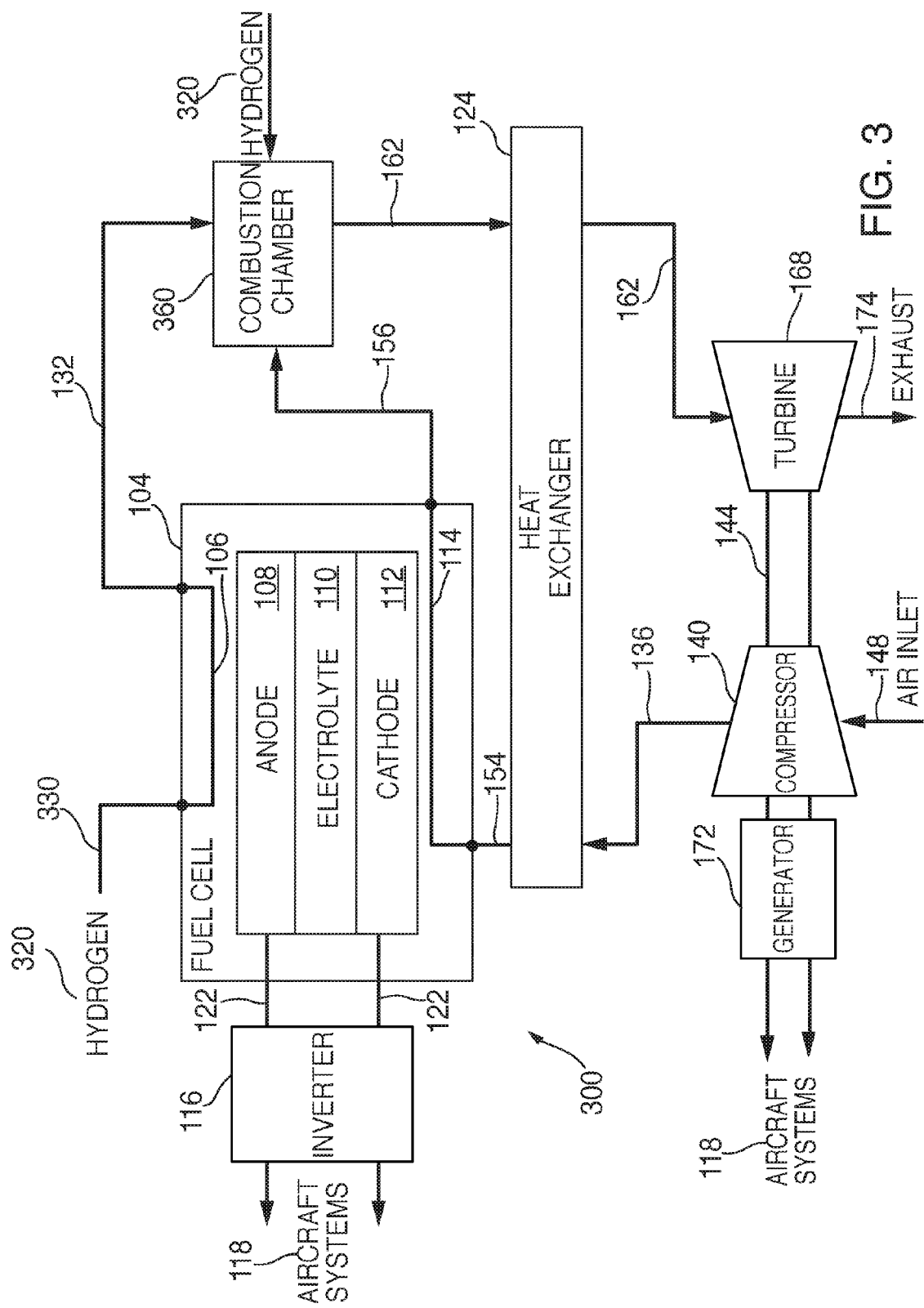
FIG. 3 is a block diagram of a third embodiment of a hybrid solid oxide fuel cell power system incorporating a rapid start-up subsystem according to the present disclosure.

Referring now to FIG. 3, a third embodiment of a hybrid solid oxide fuel cell power system 300 is shown. In this third embodiment, the fuel may be hydrogen 320 which does not require a reformer since hydrogen may be used directly by SOFC 104 to produce power. In this embodiment, a combustion chamber 360 is provided for use during the start-up period that operates on a separate supply of fuel (hydrogen) 320. Combustion chamber 360 may be a two-stage combustion chamber as in the FIG. 2 embodiment and receive exhaust 132 from SOFC 104. In one alternative embodiment, an additional combustion chamber (not shown in FIG. 3) may be provided coupled serially to combustion chamber 360 as in the FIG. 1 embodiment to generate a pressurized gas stream from exhaust 132. In another alternative embodiment, no combustion chamber may be included to receive exhaust 132. Combustion chamber 360 produces a pressurized gas stream 362 that drives turbine 368 during the initial start-up period. At least one heat exchanger 324 is configured to recuperate heat from the fuel cell 104 exhaust for the incoming reactants. As in the previous embodiments, the turbine 168 mechanically drives the compressor 140 through the drive shaft 144 and any surplus mechanical power is converted to electrical power by the generator 172.

The embodiments of an SOFC power system disclosed herein provide all the benefits of an SOFC system, i.e., high efficiency, low emissions, and logistic ease and, unlike prior SOFC systems, provide a rapid start time for providing electrical power.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A rapid start power unit comprising:
a fuel cell configured to convert combustible fuel into electrical power after a first time period and during a second time period that follows the first time period;
a first combustion chamber configured to receive unspent fuel from the fuel cell and to combust the unspent fuel to generate a first heated gas stream;
a second combustion chamber configured to receive combustible fuel from a fuel source, to burn the combustible fuel to generate a second heated gas stream during the first time period, and to disconnect from the fuel source during the second time period;
a turbine configured to receive the first heated gas stream and the second heated gas stream and to be driven by the first heated gas stream and the second heated gas stream, the turbine further configured to drive a drive shaft; and
a generator coupled to the drive shaft, the generator configured to generate, in response to the drive shaft, electrical power during the first time period and during the second time period.

2. The rapid start power unit of claim 1, further comprising a compressor coupled to the drive shaft, the compressor configured to compress a source of oxidizing gas for supplying compressed oxidizing gas to the fuel cell.

3. The rapid start power unit of claim 1, wherein the fuel cell is a solid oxide fuel cell and the combustible fuel is a hydrocarbon fuel.

4. The rapid start power unit of claim 1, further comprising a reformer configured to assist in converting the combustible fuel into reactants used by the fuel cell.

5. The rapid start power unit of claim 4, wherein the reformer is one of a steam reformer, a catalytic partial oxidation reformer, or an autothermal reformer.

6. The rapid start power unit of claim 4, wherein the reactants converted from the combustible fuel by the reformer include carbon monoxide and hydrogen.

7. The rapid start power unit of claim 1, wherein the first combustion chamber is a catalytic combustion chamber.

8. A rapid start power unit comprising:
a fuel cell configured to convert combustible fuel into electrical power after a first time period and during a second time period that follows the first time period;
a two stage combustion chamber including:
a first stage configured to receive unspent fuel emitted by the fuel cell and to combust the unspent fuel to generate a first heated gas stream; and
a second stage configured to receive combustible fuel from a fuel source, to burn the combustible fuel to generate a second heated gas stream during the first time period, and to disconnect from the fuel source during the second time period;
a turbine configured to receive the first heated gas stream and the second heated gas stream and to be driven by the first heated gas stream and the second heated gas stream, the turbine being further configured to drive a drive shaft; and
a generator coupled to the drive shaft, the generator configured to generate, in response to the drive shaft, electrical power during the first time period and during the second time period.

9. The rapid start power unit of claim 8, further comprising a compressor coupled to the drive shaft, the compressor configured to compress a source of oxidizing gas for supplying compressed oxidizing gas to the fuel cell.

10. The rapid start power unit of claim 8, wherein the fuel cell is a solid oxide fuel cell and the combustible fuel is a hydrocarbon fuel.

11. The rapid start power unit of claim 8 further comprising a reformer configured to assist in converting the combustible fuel into reactants used by the fuel cell.

12. The rapid start power unit of claim 11, wherein the reformer is one of a steam reformer, a catalytic partial oxidation reformer, or an autothermal reformer.

13. The rapid start power unit of claim 11, wherein the reactants converted from the combustible fuel by the reformer include carbon monoxide and hydrogen.

14. The rapid start power unit of claim 8, wherein the first stage of the two stage combustion chamber is a catalytic combustion chamber.

15. A method for rapidly supplying electrical power, the method comprising:
generating electrical power using a chemical conversion of combustible fuel after a first time period and during a second time period that follows the first time period;
combusting, in a first combustion chamber, unspent fuel emitted by the chemical conversion of the combustible fuel to generate a first heated gas stream;
burning, in a second combustion chamber, combustible fuel received from a fuel source to generate a second heated gas stream during the first time period;
using the first heated gas stream and the second heated gas stream to mechanically drive a generator to produce electrical power during the first time period;
disconnecting the second combustion chamber from the fuel source during the second time period; and
using the first heated gas stream to mechanically drive the generator to produce electrical power during the second time period.

16. The method of claim 15, wherein the step of using the first heated gas stream and the second heated gas stream to mechanically drive the generator comprises providing the first heated gas stream and the second heated gas stream to a turbine that drives a drive shaft coupled to the generator to produce electricity.

17. The method of claim 15, wherein a fuel cell performs the step of chemically converting combustible fuel into electrical power.

18. The method of claim 17, wherein the first time period corresponds to an initial start-up period of the fuel cell, and wherein the second time period corresponds to a normal operational period of the fuel cell.

19. The method of claim 17, wherein the first time period ends and the second time period begins upon warmup of the fuel cell.

20. The method of claim 15, further comprising, after disconnecting the fuel source from the second combustion chamber, inertly passing the first heated gas stream through the second combustion chamber.

* * * * *